United States Patent [19]

Ishida

[11] Patent Number: 4,829,943
[45] Date of Patent: May 16, 1989

[54] V-TYPE MULTIPLE CYLINDER ENGINE

[75] Inventor: Tokuji Ishida, Hamamatsu, Japan

[73] Assignee: Suzuki Jidosha Kogyo Kabushiki Kaisha, Shizuoka, Japan

[21] Appl. No.: 199,662

[22] Filed: May 27, 1988

[30] Foreign Application Priority Data

| May 29, 1987 | [JP] | Japan | 62-131699 |
| May 29, 1987 | [JP] | Japan | 62-131700 |
| May 29, 1987 | [JP] | Japan | 62-81146[U] |
| May 29, 1987 | [JP] | Japan | 62-81147[U] |
| May 30, 1987 | [JP] | Japan | 62-136531 |
| May 30, 1987 | [JP] | Japan | 62-85410[U] |
| May 30, 1987 | [JP] | Japan | 62-85411[U] |

[51] Int. Cl.[4] ............................... F02B 75/18
[52] U.S. Cl. .................... 123/52 MV; 123/52 MC
[58] Field of Search ........ 123/52 M, 52 MV, 52 MC, 123/52 MB

[56] References Cited

U.S. PATENT DOCUMENTS

| 3,111,937 | 11/1963 | Johnson et al. | 123/52 MV |
| 3,809,032 | 5/1974 | Morris | 123/52 M |
| 4,715,329 | 12/1987 | Yasuda et al. | 123/52 MV |

FOREIGN PATENT DOCUMENTS

| 0195854 | 12/1982 | Japan | 123/52 M |
| 60-60258 | 4/1985 | Japan . | |
| 60-138265 | 7/1985 | Japan . | |

Primary Examiner—David A. Okonsky
Attorney, Agent, or Firm—Bruce L. Adams; Van C. Wilks

[57] ABSTRACT

An intake apparatus for a V-type multiple cylinder engine in which cylinder rows are arranged as a pair and intake ports are disposed to face each other on an inside thereof. The intake apparatus comprises an intake manifold having a collecting section in substantially the central portion of a V-shape arrangement and branches each extending radially from the collecting section. An annular whirling chamber is mounted on the collecting section of the intake manifold and the whirling chamber is provided at the inner peripheral portion with an annular slit in communication with the collecting section. The degree of opening of the slit can be controlled by locating a regulating member such as piston valve for facilitating the atomization and vaporization of the fuel in all operating region. The collecting section may be disposed downwardly in the V-shaped arrangement so that the branches extend upwardly from the collecting section, whereby the overall height of the engine is reduced.

23 Claims, 10 Drawing Sheets

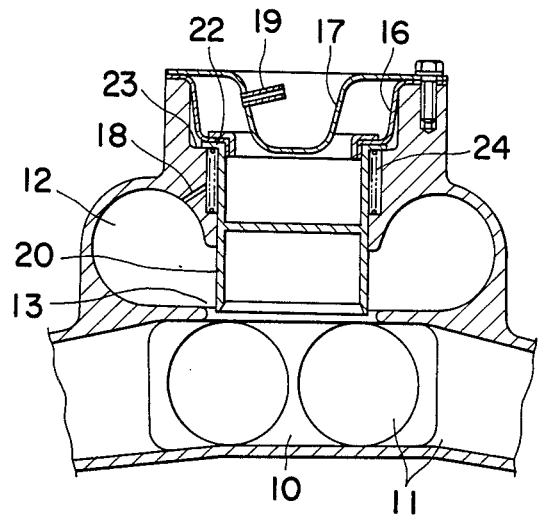
F I G. 4
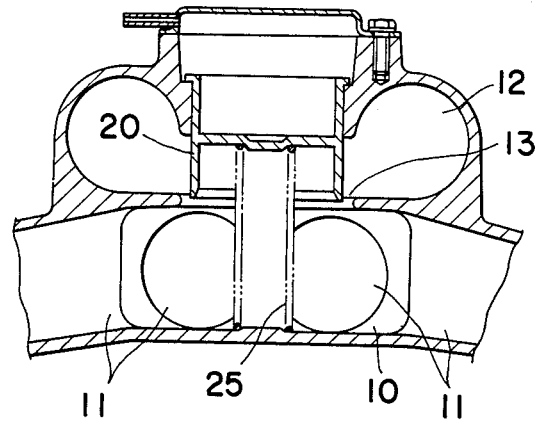
F I G. 5

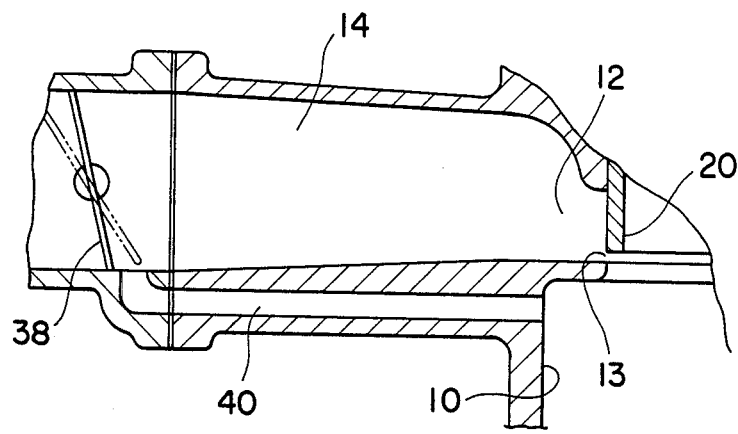
F I G. 13
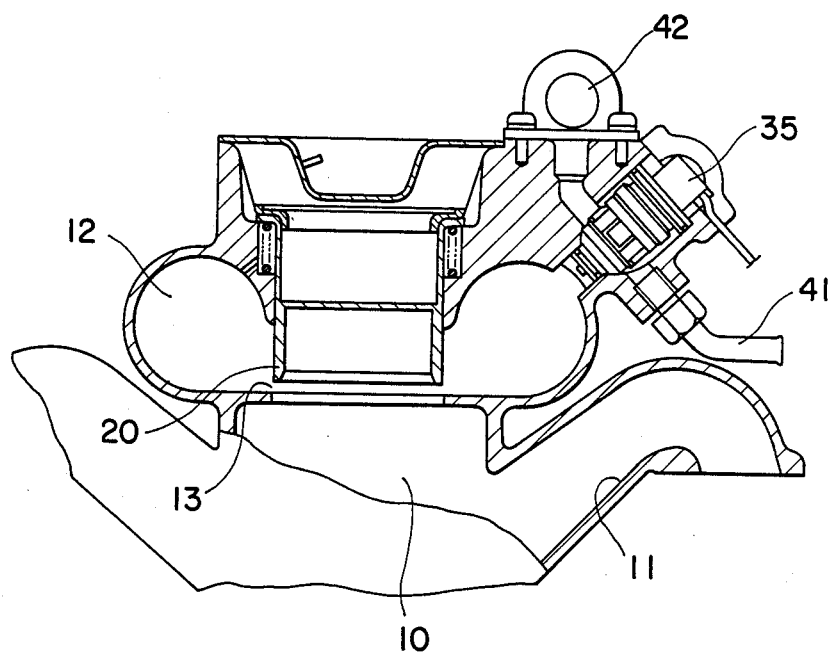
F I G. 14

V-TYPE MULTIPLE CYLINDER ENGINE

BACKGROUND OF THE INVENTION

This invention relates to a V-type multiple cylinder engine, and more particularly, to an intake apparatus for a V-type multiple cylinder engine which is adapted to distribute fuel from a fuel supplying device via an intake manifold.

A V-type multiple cylinder engine in which cylinder rows with a plurality of cylinders disposed in parallel are formed as a pair and are disposed in the form of an inclined V-shape has advantages that a degree of freedom of mounting on a vehicle is enhanced and that the engine room can be made compact since the overall engine height is reduced by a degree corresponding to the inclination of the cylinders. In addition, in a case where fuel is supplied by using a single fuel supply device, e.g., a carburetter or a single point injection, as a supply source via an intake manifold, thus making uniform the distribution of fuel into each cylinder and the arrangement of a compact intake apparatus can be attained since intake passages can be formed symmetrically from a trough of a V-shaped valley to both sides. As an apparatus having such an advantages, it may be provided intake apparatuses for V-type multiple-cylinder internal combustion engines disclosed in Japanese Patent Laid-Open Nos. 60258/1985 and 138265/1985.

Meanwhile, in an intake apparatus for an engine, a channel from a fuel supplying source to a combustion chamber is generally formed in such a manner that a recess is not formed from the top to the bottom. The reason for this is that if a recess is formed midway in the channel, fuel is supplied as a wall current in the form of a liquid since the atomization or vaporization of the fuel are not sufficiently attained during a low-temperature start or in an environment close to the same, so that the wall current flows backwardly at a rising gradient in the downstream of the recess and stagnates in the recess. The stagnated fuel is sucked into the combustion chamber at a stroke in the next step, i.e., during acceleration or the like when the amount of intake air is relatively large, the air-fuel ratio becomes over-rich, so that the smoothness of combustion becomes lacking, which results in faults such as the unsmoothness of driveability and an increase in the amount of exhaust of unburned products which contaminate the atmosphere.

This pushes up the overall height of the engine even in the case of the V-type engine which is advantageous in mounting on a vehicle, and hence there are cases where it becomes impossible to make sufficient use of the above-described advantages. In the intake apparatuses of the aforementioned Japanese Patent Laid-Open Nos. 60258/1985 and 138265/1985, branches of the intake manifold are arranged horizontally along the V-shaped valley, and a collecting section and a fuel supplying source are disposed laterally so as to restrain the overall height to a low level.

However, in an apparatus of conventional type, a collecting section of the intake manifold is disposed in a central portion of a V-shaped valley, and branches are extended with the collecting section as a center and set at least horizontally. In addition, as to a fuel supplying device and an air cleaner, an arrangement is adopted such that they are directly coupled above the collecting section to uniformly distribute the fuel in an ideal manner.

However, if the above-described arrangement is adopted, the overall engine height becomes high. A V-type engine essentially has an advantage in that the overall engine height can be made low by a portion in which the cylinders are inclined, so that the degree of freedom of mounting in a vehicle is large. However, in accordance with the request for making uniform the distribution of fuel, a described above, a problem arises in that it becomes impossible to make sufficient use of that advantage.

Among V-type multiple cylinder engines of a similar type, there is one in which a collecting section of the intake manifold is disposed laterally, and each branch is led out horizontally in parallel with a crankshaft and is connected to each intake port, so as to restrain the overall engine height to a low level (e.g., Japanese Patent Laid-Open No. 60258/1985 or 138265/1985). If an attempt is made by following that fashion to supply fuel from the fuel supplying device disposed laterally with respect to the collecting section arranged in the center, the overall engine height can be made low, but there is a problem in that an adverse effect is exerted to the uniformity of fuel distribution due to the directionality of an intake current.

SUMMARY OF THE INVENTION

Accordingly, an object of this invention is to substantially eliminate defects or drawbacks encountered to the prior art and provide an improved intake apparatus for a V-type multiple cylinder engine having a reduced overall height of the engine and capable of ensuring an excellent uniform distribution of air-fuel mixture.

Another object of this invention is to provide an intake apparatus for a V-type multiple cylinder engine capable of facilitating the atomization and vaporization of the fuel in all operating regions.

A further object of this invention is to provide an intake apparatus for a V-type multiple cylinder engine provided with a mechanism for regulating the flow rate of the air-fuel mixture in response to the operating regions for promoting the atomization of the fuel.

A still further object of this invention is to provide an intake apparatus for a V-type multiple cylinder engine provided with an arrangement capable of preventing the fuel from stagnating for the establishment of the uniform distribution of the air-fuel mixture thereby to improve the output performance of the engine.

These and other objects can be achieved according to this invention by providing an intake apparatus for a V-type multiple cylinder engine in which cylinder rows each including a plurality of cylinders disposed in parallel are arranged as a pair and intake ports are disposed to face each other on an inner side thereof, and the intake apparatus comprises an intake manifold having a collecting section located in substantially a central portion of a V-shaped arrangement and a plurality of branches each extending radially from the collecting section and having a downstream end connected to the intake port of a corresponding cylinder, an annular whirling chamber mounted on the collecting section of the intake manifold, an annular slit formed at an inner peripheral portion of the whirling chamber so as to communicate with the collecting section, and a fuel supplying device located in association with the whirling chamber on an upstream side thereof through an intake passage.

According to this construction and arrangement of the intake apparatus of the V-type multiple cylinder engine, the air-fuel mixture supplied from the fuel supplying device is introduced into the whirling chamber formed into an annular shape and whirls, and is emitted into the collecting section through the annular slit. Therefore, since the mixture is emitted in the centripedal direction in the collecting section through the slit from the horizontal whirling current, there is no partial directionality with respect to each branch, and the distribution can be made uniform. In addition, turbulence is created as a result of this emission, and the atomization of part of the fuel which has become a wall current is promoted. In addition, since the overall length of the intake pipes can be made relatively long, the volumetric efficiency in the low- and medium-speed regions can be improved.

Thus, it is possible to eliminate biased distribution, enhance the output, and reduce the exhaust of unburned harmful components, and the advantage of an engine of the V-type arrangement, which is advantageous in mounting in a vehicle, is not impaired.

In a preferred embodiment, a piston valve as a regulating member is located for the whirling chamber for regulating the degree of opening of the slit in association with a spring member.

According to this arrangement, the piston valve moves or slides vertically in response to the negative pressure of the manifold, and the open area of the slit is controlled, thereby promoting the atomization and vaporization of the fuel. In other words, since the negative pressure is high during the idling operation, the piston valve is lowered to a maximum degree, and the amount of opening of the slit is set to a minimum level required. Since the flow rate of emission is accelerated, the atomization rate improves, and since the mixture disperses in the collection section, the vaporization rate is high. Thus, in a region where the amount of intake air is small, the atomization of the fuel is promoted, and the wall current is reduced, so that the mixture is distributed uniformly into each cylinder along the air flow. In medium- and high-load regions, the negative pressure drops, and the piston valve is raised by the force of a spring by an equivalent amount to open the slit. Thus, an emission port for obtaining a volumetric efficiency coinciding with the amount of air sucked at that time is secured, so that the atomization is improved by maintaining the flow rate at a constant level.

Thus, even if an arrangement is made to inject the fuel by introducing air from the lateral direction of the collecting section, it is possible to eliminate the directionality, promote the atomization and vaporization of the fuel in all operating regions, uniformalize the distribution, and prevent combustion faults caused by the stagnation of a wall current. Hence, it is possible to make the suction system compact by making use of the V-valley and to make the overall engine height small, thereby enhancing the degree of freedom of installation on a vehicle.

In a further preferred embodiment, the collecting section is located downwardly in the V-shape arrangement of the intake apparatus so that the branches of the intake manifold extend upwardly from the collecting section so as to reduce the overall height of the engine, and a loop-shaped groove is formed in a bottom of the collecting section. The loop-shaped groove and the intake ports are communicated with each other through bypass passages.

According to this arrangement, the fuel is sufficiently vaporized in a normal operating state, so that the fuel passes through the branches and is supplied to the combustion chamber by being carried by an air current. Since the fuel supplying device and the collecting section of the intake manifold are located in the center, the fuel is distributed uniformly into each cylinder, combustion is stabilized, and smooth operation is ensured.

On the other hand, in a region of a very small amount of air during, such as during low-temperature starting, a warming-up process, or an idling operation, the atomization and vaporization of fuel are insufficient, and a wall current is liable to occur, so that the wall current tends to flow backwardly along the rising gradient of the branches and to stagnate in the bottom of the collecting section. However, as the fuel is collected in the loop-shaped groove, passes through a bypass which is open in the vicinity of an opening of each of the branches, and is sucked into the combustion chamber, the distribution into each chamber can be made uniform, and since the fuel does not stay until the next step such as for acceleration, there is no possibility of the fuel being brought out by the velocity of that flow and becoming over-rich, resulting in faulty combustion.

Namely, since faults due to the recess formed in the intake apparatus are nil, and since the collecting section can be placed at a low position in the V-shaped valley, even if the fuel supplying device and the air cleaner are superposed immediately thereabove, the overall engine height can be set to a low level, and it is possible to realize the uniformity in distribution and a compact arrangement without losing the advantages of mounting on the vehicle.

These and other preferred embodiments will be described hereinafter further in detail with reference to accompanying drawings.

BRIEF DESCRIPTION OF THE DRAWINGS

In the accompanying drawings:

FIG. 4 is a vertical cross section of a whirling chamber of the intake apparatus shown in FIG. 2 provided with a piston valve according to one modification of this invention;

FIG. 5 is also a vertical cross section of a whirling chamber of the intake apparatus shown in FIG. 2 provided with a piston valve of another modification;

FIG. 13 is a side view of a vertical elevation showing an intake passage of the intake apparatus taken along the line XIII—XIII of FIG. 12; and FIG. 14 is a front elevational view in vertical section of a whirling chamber equipped with a fuel injector of the intake apparatus of this invention.

DESCRIPTION OF THE PREFERRED EMBODIMENTS

Figure 1:
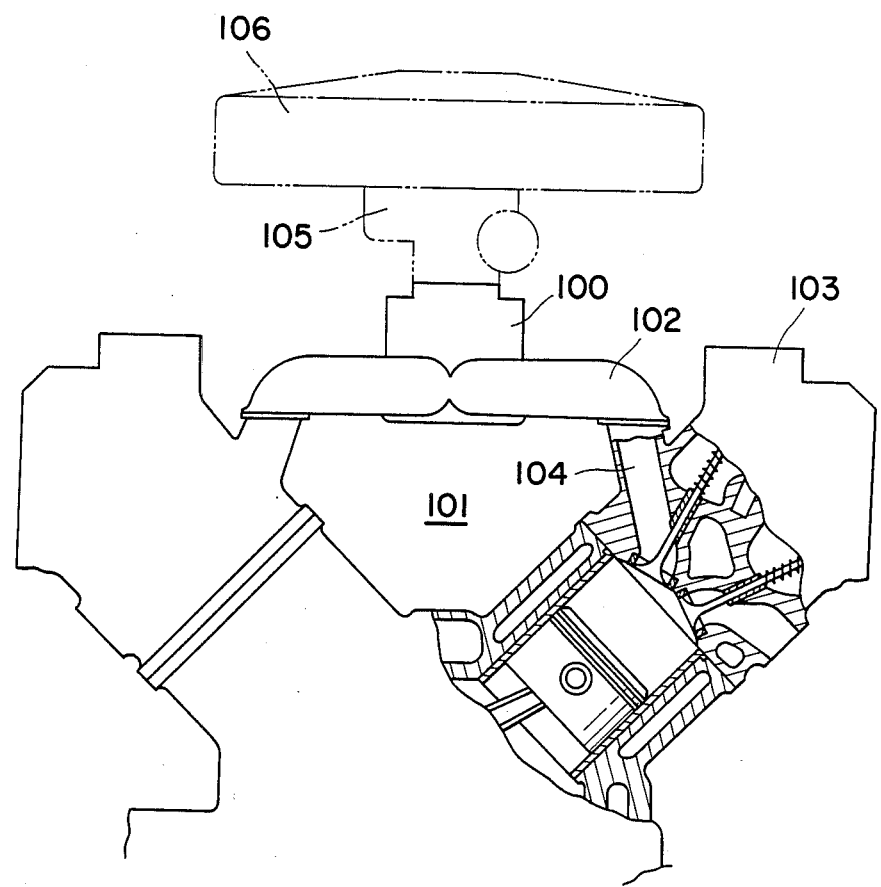
FIG. 1 is a front elevational view, partially in vertical section, for a V-type multiple cylinder engine equipped with a conventional intake apparatus.

In advance of the description of the preferred embodiments according to this invention, a V-type multiple cylinder engine provided with an intake apparatus will be first briefly described hereunder with reference to FIG. 1 for the better understanding of this invention.

Referring to FIG. 1 showing a known intake apparatus of the V-type multiple cylinder engine for, for example, a vehicle, a collecting section 100 of an intake manifold is disposed in a central portion of a V-shaped valley 101, and branches 102 extend with the collecting section 100 as a center of these branches 102 and set at least horizontally, and the collecting section 100 is located above the upper end of an intake port 104 of a cylinder head 103. In addition, the arrangement of the fuel supplying device and an air cleaner is also one of factors determining the quality of distribution, and in an illustrated example, a fuel supplying device 105 is disposed immediately above the collecting section and an air cleaner 106 is mounted directly thereabove.

According to the arrangement of the conventional intake apparatus of the V-type engine, however, there are provided defects or disadvantages described hereinbefore, particularly in point of making uniform the distribution of fuel due to the directionality of an intake current.

Figure 2:
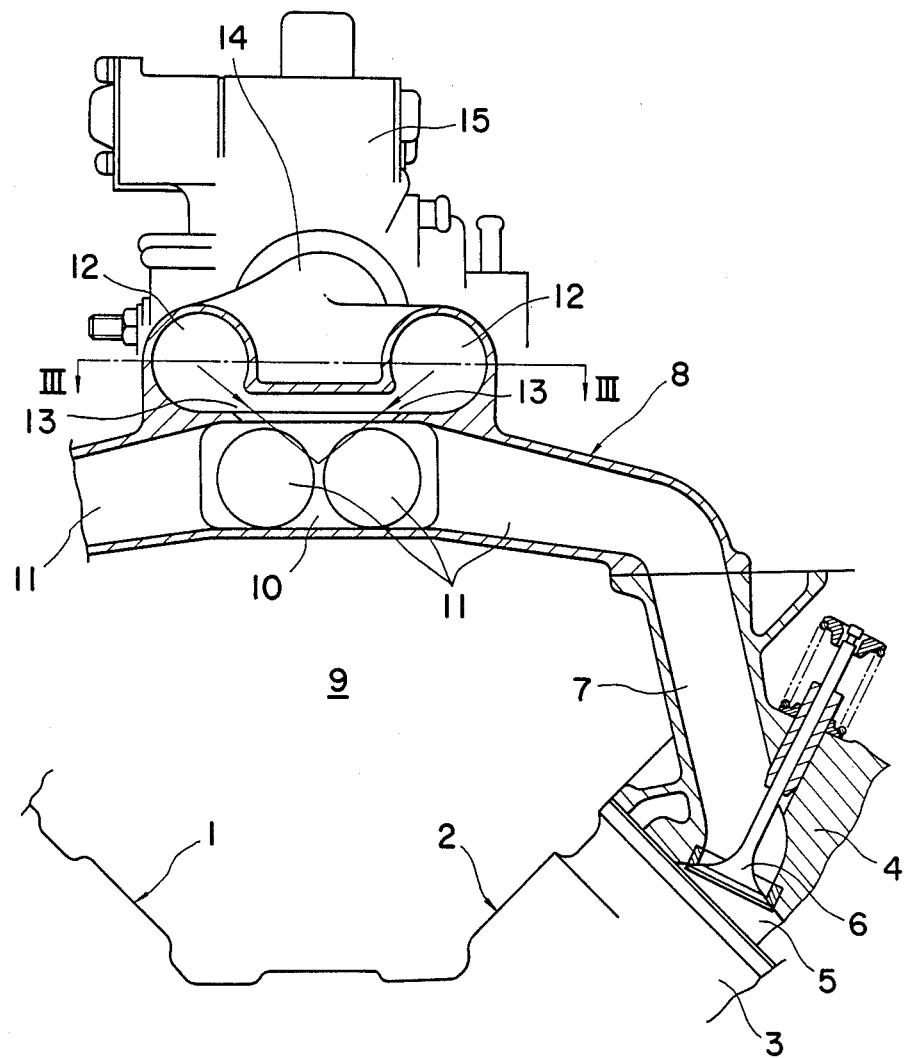
FIG. 2 is a front elevational view, partially in vertical section, of an intake apparatus for a V-type multiple cylinder engine according to one embodiment of this invention.
Figure 3:
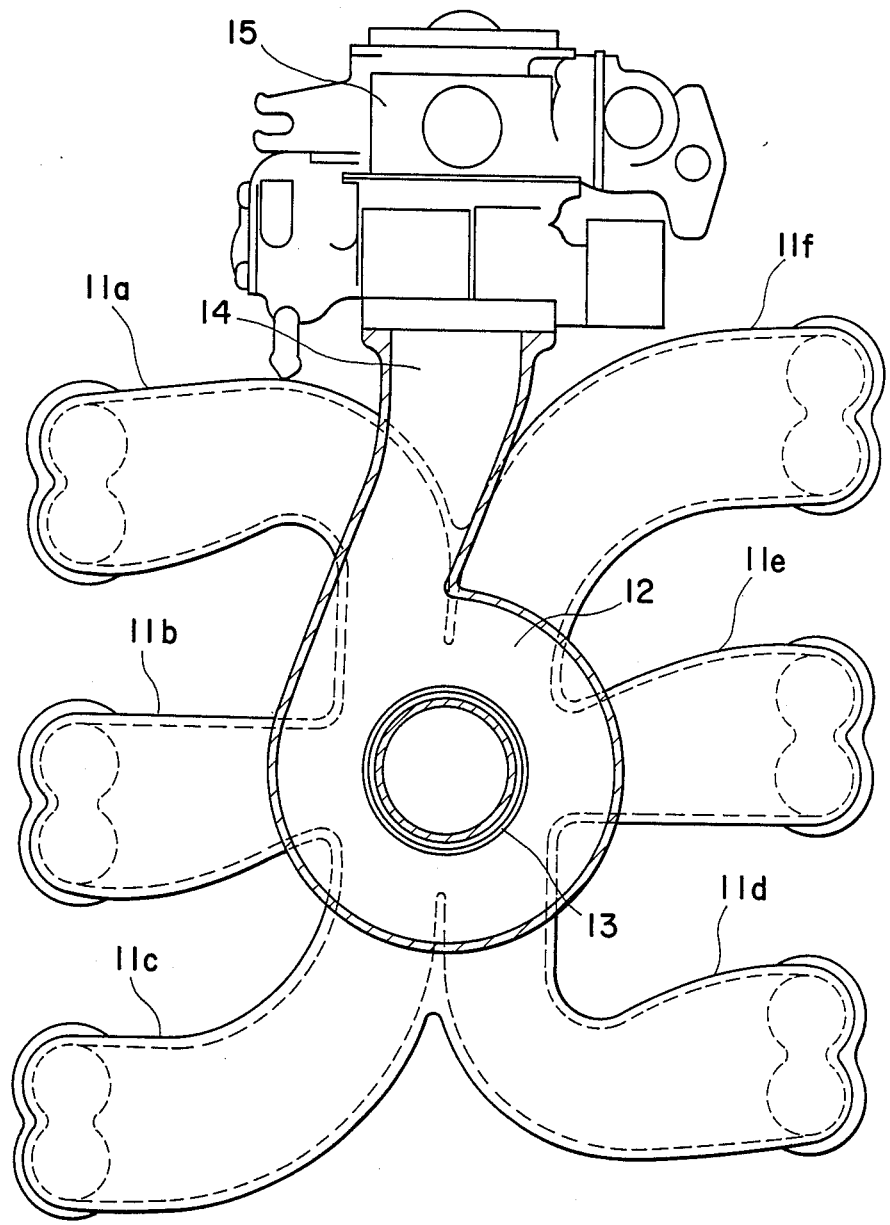
FIG. 3 is an illustration of a top plan view of an intake manifold of the intake apparatus shown in FIG. 2 taken along the line III—III.

Taking into consideration the arrangement of the conventional V-type multiple cylinder engine and defects or disadvantages encountered thereto, preferred embodiments of this invention will be described hereinafter with reference to the accompanying drawings FIG. 2 is a front elevational view, partly in vertical section, of an intake apparatus of a V-type six-cylinder engine according to one preferred embodiment of this invention, and FIG. 3 is a top plan view of the same, partly in vertical section.

Referring to FIG. 2, a V-type six-cylinder engine is arranged in such a manner that cylinder rows 1, 2 each having three cylinders disposed in parallel are disposed in the form of a V-shape. Intake ports 7 with intake valves 6 interposed are respectively provided to combustion chambers 5 formed in cylinder heads 4 of cylinders 3, such as to face the inside of the V-shape.

An intake manifold 8 connected to each of the intake ports 7 is arranged in an upper portion of a V-shaped valley 9, and six branches 11 (11a, 11b 11c 11d, 11e and 11f as shown in FIG. 3) extend substantially radially from a circular collecting section 10.

A whirling chamber 12 in the form of a circular ring is superposed on the collecting section 10 such as to be concentrical therewith. The whirling chamber 12 and the collecting chamber 10 communicate with each other by means of a ring-shaped slit 13 formed at a lower peripheral portion of the whirling chamber 12.

Since the diameter of the slit 13 is smaller than the central diameter of the whirling chamber 12, a line connecting the center of the whirling chamber 12 and the slit 13 converges toward an axis of the collecting section 10 (see the arrow).

An intake passage 14 extending in the longitudinal direction of the V-shaped valley 9 is connected tangentially to the whirling chamber 12, and a fuel supplying device 15 (carburetter or a single point injection) is connected to an upstream end of the intake passage 14.

Since the above-described arrangement is adopted, the mixture supplied from the fuel supplying device 15 passes through the intake passage 14, enters the whirling chamber 12, whirls, and is, while whirling, emitted to the collecting section 10 through the slit 13. Since the emitted current concentrates in the axis of the collecting section 10, the emitted current is agitated well, and the biased directionality with respect to each of the branches 11 is eliminated, and the fuel is distributed uniformly into each of the cylinders 3.

In addition, the atomization of the fuel is promoted by emission. The effect of atomization can be further enhanced by narrowing the area of the opening of the slit to a range that does not hamper the intake resistance, i.e., the volumetric efficiency. Even if a stagnating wall current is present in the bottom of the whirling chamber 12 because of insufficient atomization and vaporization of the fuel during starting, warming-up, idling or the like, it is possible to scoop up and inject the same, thereby promoting the atomization and vaporization. In addition, since the overall length of the intake passage can be made relatively long, the volumetric efficiency in the low- and medium-speed regions can be improved. Accordingly, the state of combustion is improved in all the operating regions, and the outer performance of the engine is enhanced.

Thus, it is possible to maintain the uniform distribution by supplying the fuel to the collecting section of the intake manifold from the horizontal direction, and it is possible to enhance the advantage of mounting on a vehicle by restraining the overall engine height to a low level.

It should be noted that the intake apparatus of this invention can also be applied to an in-line multiple cylinder engine.

The intake apparatus of the V-type six-cylinder engine may be provided with modifications of the whirling chamber 12 and the associated elements shown in FIG. 2, the modifications being illustrated in FIGS. 4 and 5, in which like reference numerals are denoted to members or elements corresponding to those shown in FIG. 2 and detailed descriptions thereof will be omitted hereinbelow.

Referring to FIG. 4, a whirling chamber 12 in the form of a circular ring is superposed on the collecting section 10 such as to be concentrical therewith. The whirling chamber 12 and the collecting section 10 communicate with each other by means of a ring shaped slit 13 formed at a low peripheral portion of the whirling chamber 12. A piston valve 20 is disposed in the whirling chamber 12 to be slidable along the inner peripheral surface thereof, and a stepped portion is formed to the inner peripheral surface of the whirling chamber 12 and a spring 24 is mounted in a space defined by the stepped portion and the peripheral wall of the piston valve to always upwardly urge the piston valve 20, serving for regulating the degree of opening of the slit 13 by the vertical displacement of the piston valve 20.

A diaphragm chamber is formed above the whirling chamber 12 and defined by a diaphragm 16 having the lower end connected to an upper flange portion 22 of the piston valve 20 at a stepped portion 23 of the diaphragm chamber. The upper end of the spring 24 abuts against the lower surface of the flange portion. The upper opening of the diaphragm chamber is covered by a diaphragm cover 17 having a cross sectional configuration shown in FIG. 4, for example. A negative pressure passage 18 is disposed for the communication between the spring space and the whirling chamber 12. An orifice member 19 is disposed to the diaphragm cover 17 for adjusting the pressure difference between the diaphragm chamber and the atmosphere.

According to the arrangement described above, the mixture supplied from the fuel supplying device 15 passes through the intake passage 14, enters the whirling chamber 12, whirls, and is, while whirling, emitted to the collecting section 10 through the slit 13. The emitted current concentrates in the axis of the collecting section 10, and the emitted current is then well agitated into a turbulence flow, whereby the biased directionality with respect to each of the branches 11 is eliminated and the fuel is uniformly distributed into the cylinders, respectively.

At this time, the piston valve 20 is displaced vertically in response to the negative pressure of the sucked mixture on the collecting section to thereby regulate the degree of opening of the slit 13. In an idling operation, the negative pressure becomes relatively strong, so that the piston valve 20 is maximumly lowered against the urging force of the spring 24 to the position at which the flange portion 22 of the piston valve 20 comes into contact to the stepped portion 23 of the diaphragm chamber to reduce minimumly the degree of opening of the slit 13. Under this condition, the amount of air to be taken in is made reduced and the fuel is insufficiently atomized, but since the slit 13 is reduced, the flowing speed of the fuel into the collecting section 10 is made high and the atomization thereof is facilitated.

When the operation progresses into a neutral load region, the negative pressure is lowered in its degree, and accordingly, the piston valve 20 is upwardly displaced by the amount corresponding to the reduction of the negative pressure to thereby increase the degree of the opening of the slit 13. Under this condition, the air to be introduced is increased, the flowing speed or rate of the fuel into the collecting section is kept constant and atomized without adversely affecting on the volumetric efficiency.

When the operation further progresses into a high speed load region, the negative pressure approaches the atmospheric pressure and the piston valve 20 is further upwardly displaced to the extent of the maximum degree to widely open the slit 13 and to ensure the emitting area sufficient to obtain a high volumetric efficiency. The amount of air to be sucked becomes maximum, and accordingly, the fuel is sufficiently atomized by the turbulence naturally occurring and distributed into the respective cylinders.

FIG. 5 shows another modification in which a spring 25 for upwardly urging the piston valve 20 is disposed in the collecting section 10, and the function of the spring 25 is substantially the same as that of the spring 24. According to this arrangement, the fuel from the whirling chamber 12 collides with the spring 25, thus facilitating the atomization of the fuel.

According to the embodiments shown in FIGS. 4 and 5, the degree of opening of the slit through which the fuel is introduced into the collecting section can be variably regulated in proportion to the amount of the air introduced, so that the atomization and carburetion can be effectively facilitated in the entire load region without affecting on the volumetric efficiency, and the fuel can be uniformly distributed to the respective cylinders along the air flows to achieve the stable combustion and the restriction of the discharge of unburnt gas.

Figure 6:
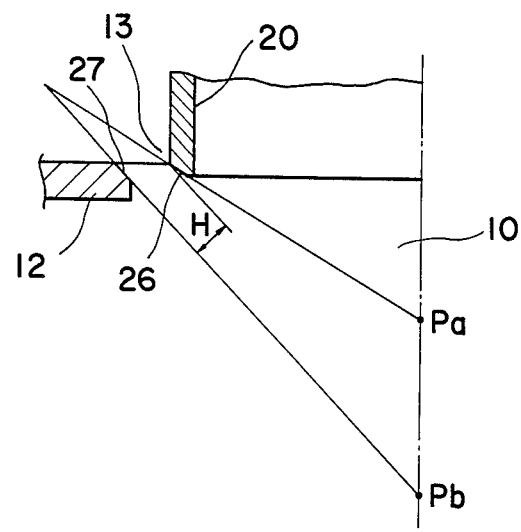
FIG. 6 shows a cross section of portions of the whirling chamber and the piston valve provided with chamfered surfaces.

In a further preferred embodiment, as shown in FIG. 6, the lower peripheral edge of the piston valve 20 and the bottom of the whirling chamber 12 constituting the lower peripheral edge of the slit 13 are formed as chamfered surfaces 26 and 27 respectively so that when the piston valve 20 is lowered to the extent that the upper flange portion 22 of the piston valve 20 abuts against the stepped portion 23 of the diaphragm chamber, the slit 13 has the degree H of the opening at which the air during the idling operation is ejected at an ejecting speed of 50 to 150 m/sec., preferably about 90 to 110 m/sec. The chamfered surfaces 26 and 27 have inclinations opened towards the axis of the collecting section 10 to intersect therewith at portions Pa and Pb as shown in FIG. 6.

According to the design of the chamfered surfaces 26 and 27 defining the degree of the opening of the slit 13, the fuel can be defused widely, thereby facilitating the atomization thereof.

Figure 7:
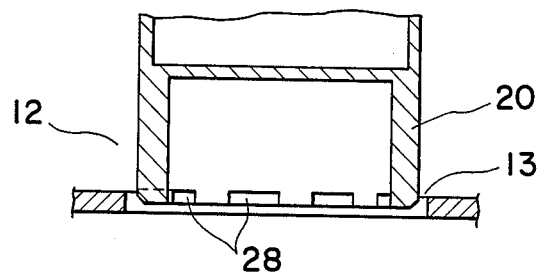
FIG. 7 is a vertical cross section of a further modification of the piston valve.
Figure 8:
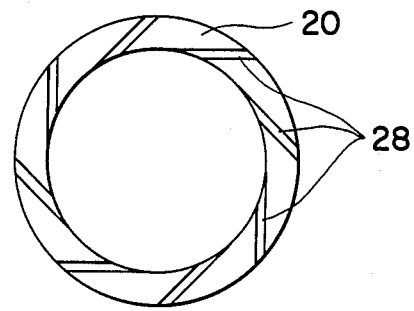
FIG. 8 is a plan view of the piston valve viewed from the lower side thereof shown in FIG. 7.

Referring to FIGS. 7 and 8 showing a further preferred embodiment of the piston valve 20, in which a plurality of radial grooves 28 are formed in the lower end of the piston valve 20 so as to extend in the tangential directions thereof. According to this structure of the piston valve 20, the fuel is guided and strongly whirled by the location of the radial grooves 28 thereby to further facilitate the atomization of the fuel particularly during the idling operation with the small degree of the opening of the slit 13.

According to another aspect of this invention, the collecting section is disposed in substantially the central portion of the V-shaped valley to reduce the whole height of the engine while keeping the uniform distribution of the fuel to the respective cylinders.

Figure 9:
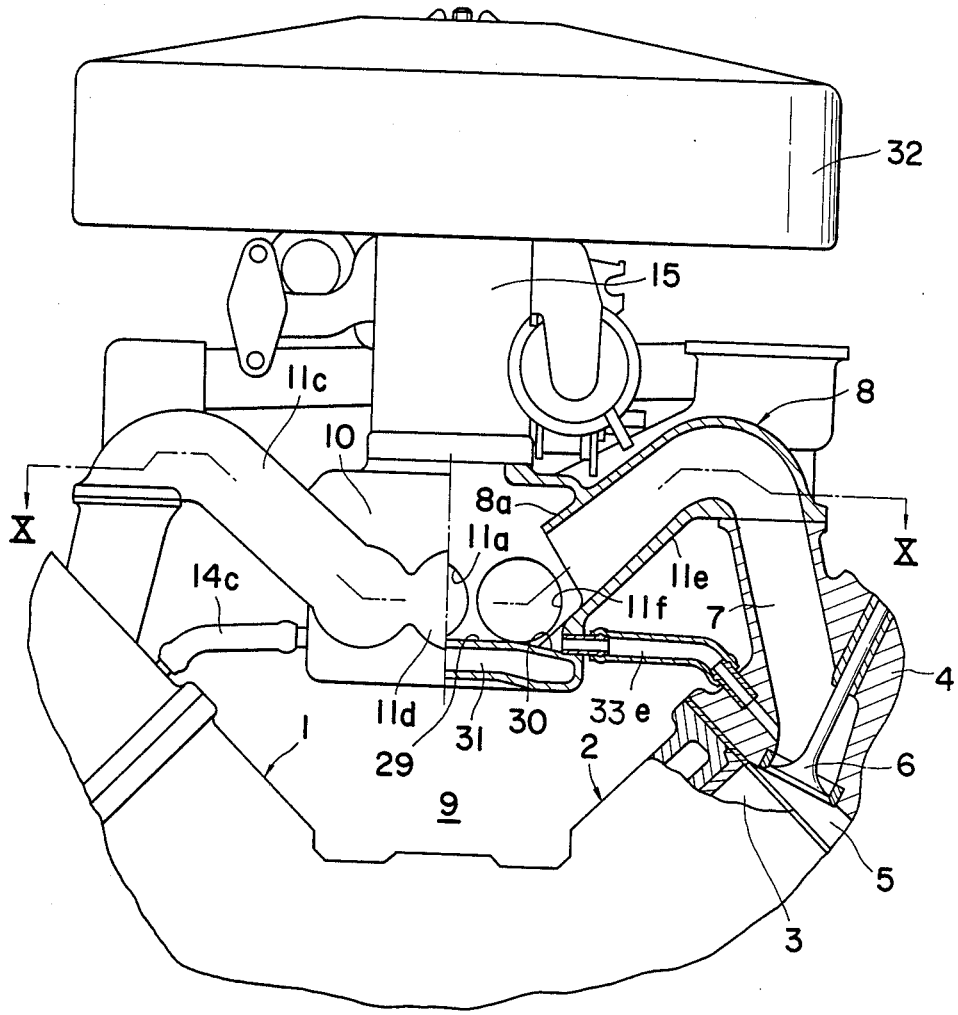
FIG. 9 is a front elevational view, partially in vertical section, for a V-type multiple cylinder engine according to another embodiment of this invention.
Figure 10:
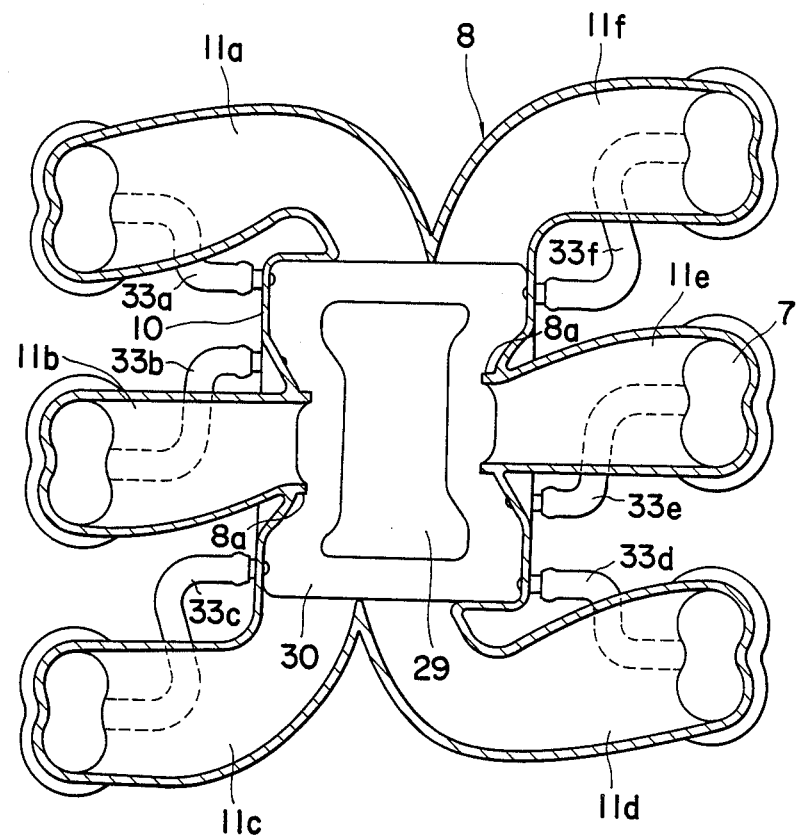
FIG. 10 is an illustration of a top plan view of an intake manifold of the intake apparatus shown in FIG. 9 taken along the line X—X.

FIG. 9 is a front elevational view, partially in vertical section, of an intake apparatus of a V-type six-cylinder engine of the type similar to that shown in FIG. 2, and FIG. 10 is a top plan view of an intake manifold taken along the line X—X of FIG. 9. With reference to FIGS. 9 and 10, like reference numerals are denoted to elements or members corresponding to those shown in FIGS. 2 to 8.

In this embodiment, the respective branches 11 (11a to 11f) of the intake manifold 8 extend upwardly from the collecting section 10, which is disposed downwardly in the V-shaped arrangement and the detail are as follows.

A V-type six-cylinder engine is arranged in such a manner that cylinder rows 1, 2 each having three cylinders disposed in parallel are disposed in the form of a V-shape, an intake port 7 with an intake valve 6 interposed communicates with a combustion chamber 5 formed in a cylinder head 4 of each of the cylinders. These intake ports 7 are arranged in parallel on the inner side of the V-shape.

An intake manifold 8 connected to each of the intake ports 7 is arranged in a V-shaped valley 9. This collecting section 10 is arranged at a central position of arrays of the intake ports 7 such as to be lower than upstream ends of the intake ports 7. Upstream ends of branches 11a, 11b 11c, 11d 11e, and 11f are open on side walls of the collecting section 10, while downstream ends thereof are respectively connected to the intake ports 7 of the cylinders. Accordingly, the branches 11a, 11b, 11c, 11d, 11f, and 11f take the posture of being inclined upwardly toward the downstream side.

Next, a loop-shaped groove 30 is formed in a bottom 29 of the collecting section 10 along a peripheral edge thereof. In addition, upstream ends of bypasses 33 (33a to 33f) are opened at a lowermost portion of the aforementioned groove 30 adjacent to an open end of each of the branches 11 opening toward the collecting section 10, while the downstream ends are inclined downwardly and are opened immediately upstream of intake valves 6 of the intake ports 7 of the respective cylinders.

A fuel supplying device 15 (carburetter or single point injection) is connected above the collecting section 10, and an air cleaner 32 is connected such as to be superposed thereon. Incidentally, a heating jacket 31 is formed below a bottom 29 of the collecting section 10, while extending portions 8a are formed by extending the upstream ends of the branches 11b, 11e belonging to intermediate cylinders of the cylinder rows 1, 2, such as to project therefrom, and are designed to secure effective pipe lengths equivalent to those of the other branches.

By virtue of the above-described arrangement, in a normal state of operation, atomization of the fuel supplied from the fuel supplying device 15 is relatively advanced. The fuel is under a condition where it is liable to be come vaporized by being heated by the hot water in the heating jacket 31 and is distributed to each of the cylinders after being made into a complete combustion gas. In this case, since the lengths of the branches 11 are substantially equal by means of the branch extending portion 8a, the relationship of forces of negative pressure generated by the strokes of the pistons are transmitted to the respective branches substantially equally, and since the fuel supplying device 15 is located in the center, the sufficiently vaporized fuel is distributed uniformly into each of the cylinders as an air current regardless of the gradient of the branches, so that combustion is stabilized, and a smooth operation is obtained.

In a region of a very small amount of air during, such as, low-temperature starting, a warming-up process, or an idling operation, the atomization and vaporization of the fuel are insufficient, so that the flow is liable to become aligned with walls of the branches 11, i.e., wall currents, and the fuel which cannot ride over the rising gradient flows backwardly and returns to the collecting section 10. However, since the bypasses 33 that belong to the respective branches thereof are opened in proximity thereto, these currents are sucked into the combustion chamber disposed in the same row via the groove 30.

Accordingly, it is possible to prevent the occurrence of troubles of combustion resulting from the bringing in of excessive fuel into the combustion chamber in the next step, in a state in which the amounts of fuel supplied vary and a large amount of fuel stagnates in the recess due to the wall currents, and the distribution of fuel in the region where the amount of air is very small can be made uniform.

In cases where a difference in the flow rate arises to the fuel flowing through bypasses due to the positional relationship with the fuel supplying device, it is possible to enhance the accuracy by controlling orifices and the like. In addition, as for advantages of the bypasses, if the downstream ends of the bypasses which open in the intake ports 7 immediately upstream of the intake valves 6 are oriented toward the swirling direction, the combustion speed in a low-load region can be enhanced, smooth combustion can be obtained even with a lean air-fuel ratio, the economic efficiency can be improved, and the exhaust of harmful components can be controlled.

As described hereinbefore, according to this invention, the whole vertical height of the engine can be minimumly reduced, and the uniform distribution of the mixture gas and the improved atomization of the fuel can be achieved. These effects and advantages are further improved by the combined structure of the embodiments shown in FIGS. 2 and 9.

Figure 11:
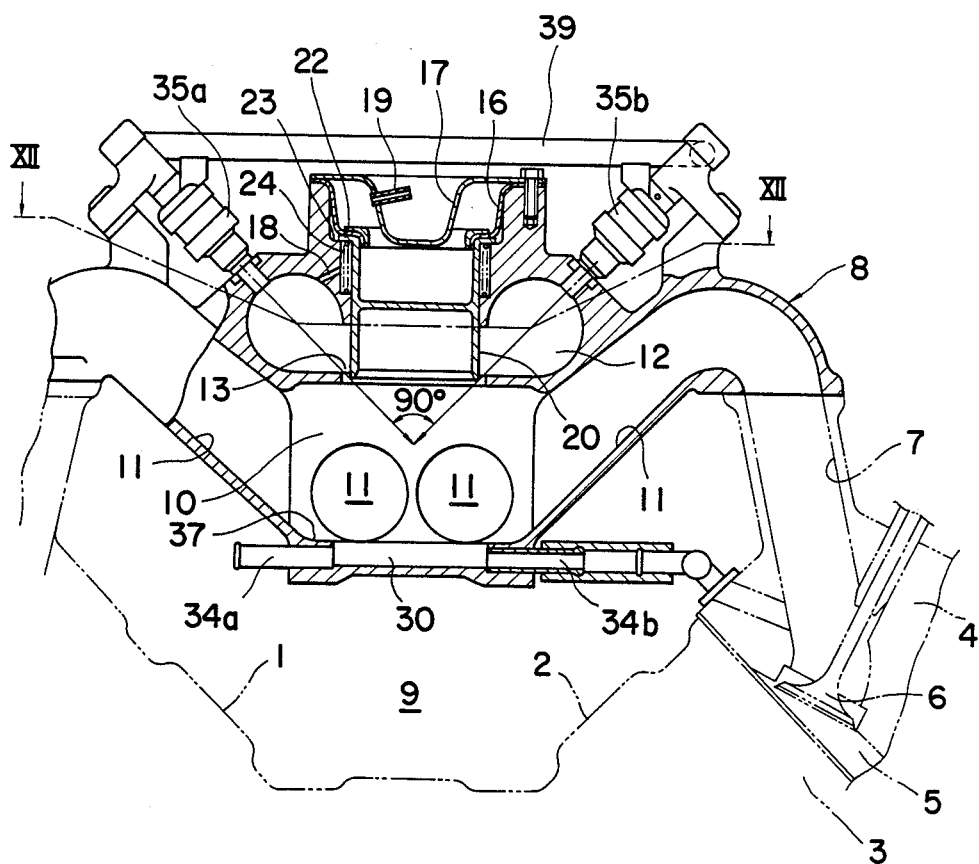
FIG. 11 is a front elevational view, partially in vertical section, for a V-type multiple cylinder engine according to further embodiment of this invention.
Figure 12:
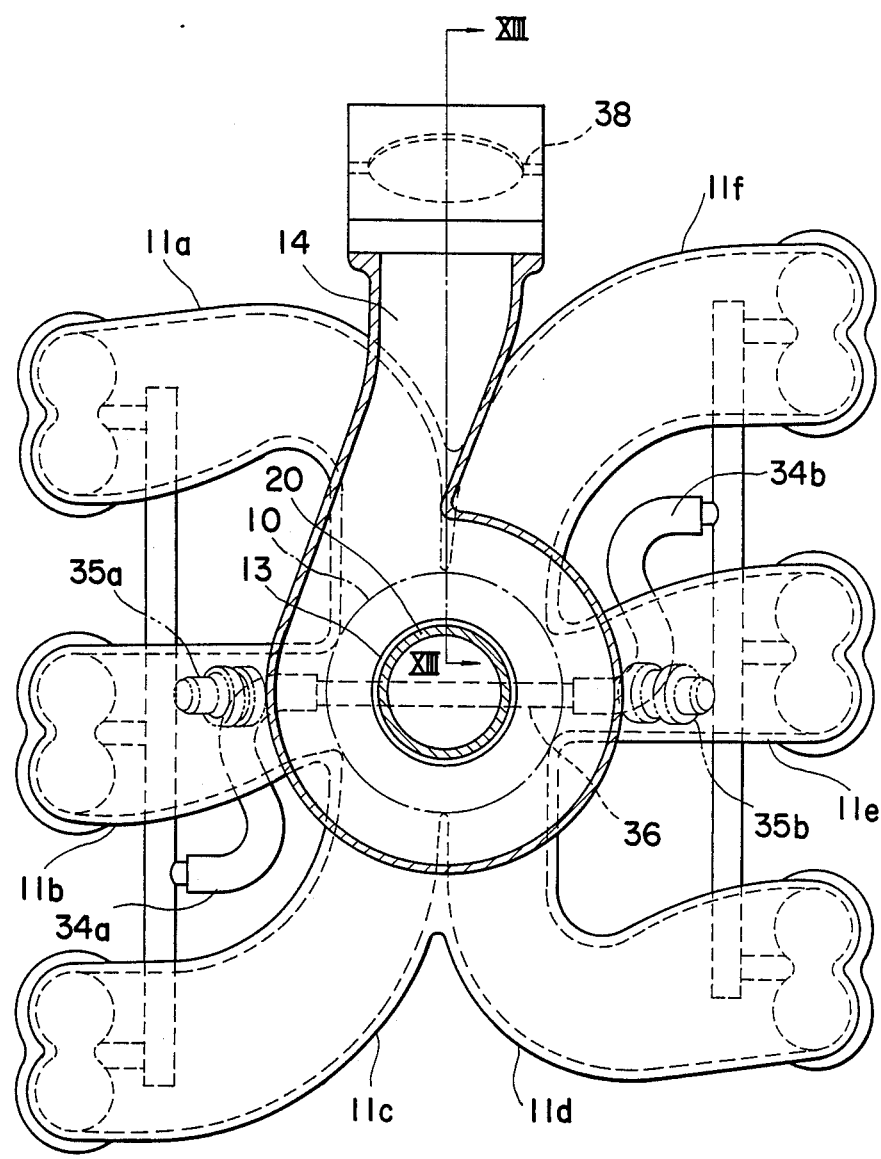
FIG. 12 is an illustration of a top plan view of an intake manifold of the intake apparatus shown in FIG. 9 taken along the line XII—XII.

FIGS. 11 and 12 show one example of the intake apparatus for V-type multiple cylinder engine having a combined structure described above with some modifications, and like reference numerals are denoted to elements and members corresponding to those shown in FIGS. 2 through 10 with respect to the preferred embodiments of this invention.

Referring to FIGS. 11 and 12, the V-type six-cylinder engine is arranged such that cylinder rows 1, 2 each having three cylinders arranged in parallel are disposed in a V-shape. An intake port 7, which communicates with a combustion chamber 5 formed in a cylinder head 4 of each cylinder 3, is provided such as to face the inside of the V-shape with an intake valve 6 interposed therebetween.

An intake manifold 8 connected to each of the intake ports 7 is so arranged that a cylindrical collecting section is disposed deeply in a central portion of a V-shaped valley 9, and six branches 11 extend radially, inclining diagonally upwardly from a peripheral edge of the collecting section 10.

A whirling chamber 12 in the form of a circular ring is superposed on the collecting section 10 concentrically therewith. The whirling chamber 12 and the collecting section 10 communicate with each other through a cylindrical slit 13 provided in an inner peripheral lower portion of the whirling chamber 12. In addition, a piston valve 20 which is constantly urged upwardly by a spring 24 is fitted with an inner peripheral surface of the whirling chamber 12 such as to be vertically slidable. A lower end portion of the piston valve 20 is adapted to increase or decrease the amount of opening of the slit 13 by virtue of the vertical displacement. A diaphragm chamber is located above the whirling chamber 12 and defined by a diaphragm 16 having the lower end connected to an upper flange portion 22 of the piston valve 20 at a stepped portion 23 of the diaphragm chamber. The upper end of the spring 24 abuts against the lower surface of the flange portion. The upper opening of the diaphragm chamber is covered by a diaphragm cover 17 having a cross sectional configuration shown in FIG. 4, for example. A negative pressure passage 18 is disposed for the communication between the spring space and the whirling chamber 12. An orifice member 19 is disposed to the diaphragm cover 17 for adjusting the pressure difference between the diaphragm chamber and the atmosphere.

An air passage 14 extending vertically along the V-shaped valley 9 is connected to the whirling chamber 12 in a tangential direction, and a throttle valve 38 is interposed at an upstream end of the air passage 14 so as to control the amount of intake air.

A pair of fuel injectors 35a and 35b are disposed in the whirling chamber 12 in the bilaterally symmetrical fashion with their injection ports facing the inside of the chamber. A fuel is supplied to the fuel injectors 35a and 35b through a fuel supply pipe 39. The fuel injectors 35a and 35b are arranged such that their injection directions are oriented toward the slit 13 when the piston valve 20 is located at its lowermost position, and that extensions of the fuel injectors 35a and 35b intersect each other at an angle of 90 degrees in an upper portion of the collecting section 10 and on an axis thereof. This angular relationship may be applicable to the fuel injectors described with reference to FIG. 2.

In addition, a groove 30 is formed in a bottom 37 of the collecting section 10, and bypasses 34a and 34b are provided at lowermost positions thereof. The downstream sides of the bypasses 34a and 34b are branched, and communicate with the intake port 7 immediately upstream of the intake valve 6 of each of the cylinders 3.

Since the above-described arrangement is adopted, the air measured by the throttle valve 38 passes through the air passage 14 and enters the whirling chamber 12, where it whirls and is, while whirling, emitted to the collecting section 10 through the slit 13. At the same time, the fuel injected from the fuel injectors 35a and 35b collides against the emitted air flow, and is, while being atomized, sent to the collecting section 10. This air-fuel mixture sent to the collecting section 10 converges while whirling toward the axis of the collecting section 10, and is made into a well agitated fine turbulence, with the result that the mixture is distributed uniformly to each cylinder 3.

Meanwhile, the piston valve 20 responds to the negative pressure of the intake air and controls the amount of opening of the slit 13.

Since the negative pressure is strong during such as idling, the piston valve 20 is pulled fully to a stopper constituted by a stepped portion 23 formed by a flange 22 and a diaphragm chamber, so that the slit 13 is provided with a minimum amount of opening required. At this time, the amount of intake air is small and the atomization of the fuel is in an insufficient state. However, the amount of opening of the slit 13 is controlled such as to set the injection current at a flow rate of about 50 to 150 m/sec., preferably 90 to 110 m/sec., so that the atomization of the injected fuel is promoted.

In the medium-load region, the negative pressure declines, so that the piston valve 20 is lifted by the force of the spring 24 by an equivalent amount so as to increase the amount of opening of the slit 13. Since the amount of air intake is increased, the flow rate of injection is maintained at a constant level, and atomization is carried out without impairing the volumetric efficiency.

In the high-speed load region, the negative pressure approaches the atmospheric pressure, and the piston valve 20 rises to an upper limit to further increase the amount of opening of the slit 13. An injection area sufficient to obtain a high volumetric efficiency is secured, and the amount of intake air becomes maximum at this time, so that the fuel is sufficiently atomized by the naturally occurring turbulence before it is distributed to each cylinder.

The sufficiently atomized fuel is carried by the air flow and is supplied regardless of the rising gradient of each of the branches 11. When a wall current is created by the branch 11 due to insufficient atomization under poor conditions at the time of cold start or an early period of warming-up, the fuel flows backwardly along the rising gradient, then flows into the groove 30 in the bottom 37 of the collecting section, and is immediately distributed to each combustion chamber 5 by means of the bypasses 34a and 34b without stagnating, so that the supply of over-rich fuel in the next step is prevented in advance.

In one modification shown in FIG. 13, a bypass 40 is located below, in the illustrated state, the whirling chamber 12 so that the upstream end of the bypass 40 opens to the intake passage 14, i.e. the whirling chamber 12, at directly downstream side of the location of the throttle valve 38 and the downstream end of the bypass 40 opens to the collecting section 10. In an operation, the bypass 40 communicates with the intake passage 14 when the throttle valve 38 is in an idling operation position, whereby the inside of the bypass 40 is in a state of the negative pressure of substantially the same level as that in the intake passage 14, the whirling chamber 12 and the collecting section 10. When the throttle valve 38 opens, as shown in FIG. 13 by chain lines, air flows through the bypass 40 into the collecting section 10 to thereby reduce the negative pressure state therein, thus improving the uniform distribution of the fuel and effectively facilitating the atomization thereof.

The opening of the bypass 40 at the downstream end thereof may be formed to direct the tangential direction of the collecting section 10, whereby the whirling flow in the collecting section is further accelerated by the introduced air thereby to further facilitate the atomization of the fuel.

Although this modification is described with respect to the embodiment shown in FIGS. 11 and 12, it should be noted that the throttle valve 38 can be located in association with the intake passage 14 of the embodiment represented by the illustration of FIG. 2 with substantially no problem.

In addition, FIG. 14 illustrates a further modification, in which a fuel supply pipe 41 is led to a fuel injector 35 from above or from below of the intake apparatus and is connected to a fuel regulator 42 disposed thereabove. This arrangement makes it possible to smoothly return the air mixed in the fuel to a tank, and is also applicable to the embodiment described with reference to FIG. 2.

It should be also understood by persons in the art that this invention is not limited to the described preferred embodiments, but various other changes or modifications may be made according to this invention without departing from scopes or spirits defined in appended claims.

What is claimed is:

1. An intake apparatus for a V-type multiple cylinder engine in which cylinder rows each including a plurality of cylinders disposed in parallel are arranged as a pair and intake ports are disposed to face each other on an inner side thereof, said intake apparatus comprising:
  an intake manifold having a collecting section located in substantially a central portion of a V-shaped arrangement and a plurality of branches each extending radially from said collecting section and having a downstream end connected to said intake port of a corresponding cylinder;
  an annular whirling chamber mounted on said collecting section of the intake manifold;

an annular slit formed at an inner peripheral portion of said whirling chamber so as to communicate with said collecting section; and a fuel supplying device located in association with said whirling chamber on an upstream side thereof through an intake passage.

2. The intake apparatus according to claim 1 wherein said intake passage extends from said whirling chamber horizontally in a tangential direction thereof.

3. The intake apparatus according to claim 1 wherein means for regulating degree of opening of said slit is disposed to be vertically slidable in said whirling chamber.

4. The intake apparatus according to claim 3 wherein said opening regulating means comprises an annular piston valve having an outer wall in slidable contact with an outer surface of a wall defining said whirling chamber and a spring upwardly urging said piston valve in a direction to open the slit.

5. The intake apparatus according to claim 4 wherein said spring is disposed in a space defined by the outer wall of said piston valve and the outer surface of the wall of said whirling chamber.

6. The intake apparatus according to claim 4 wherein said spring is disposed in the collecting section located below the whirling chamber.

7. The intake apparatus according to claim 4 wherein a lower end of said piston valve and an edge portion of a lower peripheral wall of said whirling chamber, the lower end of the piston valve and the edge portion of the whirling chamber opposing to each other, are both provided with chamfered surfaces having inclinations opened towards an axis of the collecting section.

8. The intake apparatus according to claim 4 wherein said piston valve has an annular lower end provided with a plurality of slits each extending in a direction tangential to an inner periphery of said piston valve.

9. The intake apparatus according to claim 1 wherein said intake passage is provided with a bypass passage having one end opened to the intake passage and another end opened to the collecting section and wherein a throttle valve means is located in the intake passage on an upstream side of the opening of the bypass passage to regulate air flow rate.

10. The intake apparatus according to claim 1 wherein said branches of the intake manifold extend horizontally from said collecting section.

11. The intake apparatus according to claim 1 wherein said collecting section is located downwardly in the V-shaped arrangement of the intake apparatus and said branches extend radially upwardly from said collecting section so as to reduce an overall height of the engine.

12. The intake apparatus according to claim 11 wherein the intake passage extends from the whirling chamber horizontally in a tangential direction thereof.

13. The intake apparatus according to claim 11 wherein means for regulating degree of opening of said slit is disposed to be vertically slidable in said whirling chamber.

14. The intake apparatus according to claim 13 wherein said opening regulating means comprises an annular piston valve having an outer wall in slidable contact with an outer surface of a wall defining said whirling chamber and a spring upwardly urging said piston valve in a direction to open the slit.

15. The intake apparatus according to claim 14 wherein said spring is disposed in a space defined by the outer wall of said piston valve and the outer surface of the wall of said whirling chamber.

16. The intake apparatus according to claim 14 wherein said spring is disposed in the collecting section located below the whirling chamber.

17. The intake apparatus according to claim 14 wherein a lower end of said piston valve and an edge portion of a lower peripheral wall of said whirling chamber, the lower end of the piston valve and the edge portion of the whirling chamber opposing to each other, are both provided with chamfered surfaces having inclinations opened towards an axis of the collecting section.

18. The intake apparatus according to claim 14 wherein said piston valve has an annular lower end provided with a plurality of slits each extending in a direction tangential to an inner periphery of said piston valve.

19. The intake apparatus according to claim 11 wherein said intake passage is provided with a bypass passage having one end opened to the intake passage and another end opened to the collecting section and wherein a throttle valve means is located in the intake passage on an upstream side of the opening of the bypass passage to regulate air flow rate.

20. The intake apparatus according to claim 11 wherein the fuel supplying device comprises a pair of fuel injectors located bilaterally symmetrically with each other and having injection openings directed to the whirling chamber.

21. The intake apparatus according to claim 20 wherein extensions of the injection openings of said fuel injectors intersect with each other on a central axis of the collecting section at an angle of about 90 degrees.

22. The intake apparatus according to claim 11 wherein downstream ends of said branches are connected with the intake ports, respectively.

23. The intake apparatus according to claim 22 wherein a loop-shaped groove is formed in a bottom of said collecting section and said loop-shaped groove and said intake ports are in communication with each other through bypass passages in a manner that an upstream end of each of the bypass passages is opened at a lowermost portion of said loop-shaped groove at a position adjacent to an open end of each of the branches opened towards said collecting section, while a downstream end thereof is opened to said intake port immediately upstream of each intake valve for the corresponding intake port.

* * * * *